US005755347A

United States Patent [19]

Ingram

[11] Patent Number: 5,755,347
[45] Date of Patent: *May 26, 1998

[54] TAMPER INDICATING PACKAGE

[75] Inventor: Keith W. Ingram, Holland, Ohio

[73] Assignee: Owens-Illinois Closure Inc., Toledo, Ohio

[*] Notice: The term of this patent shall not extend beyond the expiration date of Pat. No. 5,090,788.

[21] Appl. No.: 807,184

[22] Filed: Feb. 27, 1997

Related U.S. Application Data

[63] Continuation-in-part of Ser. No. 535,803, Sep. 28, 1995, Pat. No. 5,611,446, which is a continuation-in-part of Ser. No. 239,141, May 6, 1994, Pat. No. 5,462,184, which is a division of Ser. No. 224,365, Apr. 7, 1994, Pat. No. 5,370,520, which is a continuation of Ser. No. 987,035, Dec. 7, 1992, Pat. No. 5,310,069, which is a division of Ser. No. 822,001, Jan. 16, 1992, Pat. No. 5,219,507, which is a division of Ser. No. 386,391, Jul. 27, 1989, Pat. No. 5,090,788.

[51] Int. Cl.$^6$ ................................................ B65D 41/34
[52] U.S. Cl. ................................................ 215/252
[58] Field of Search ........................ 215/252, 258, 215/256, 330, 217, 218, 901

[56] References Cited

U.S. PATENT DOCUMENTS

| 4,394,918 | 7/1983 | Grussen. | |
|---|---|---|---|
| 4,653,657 | 3/1987 | Papavasilopoulos. | |
| 4,807,771 | 2/1989 | Roy et al.. | |
| 4,981,230 | 1/1991 | Marshall et al. | 215/252 |
| 5,090,788 | 2/1992 | Ingram et al. | 215/252 |
| 5,129,530 | 7/1992 | Fuchs | 215/252 |
| 5,167,335 | 12/1992 | McBride et al.. | |
| 5,282,540 | 2/1994 | Beck | 215/252 |
| 5,443,171 | 8/1995 | Sprowl | 215/252 |
| 5,462,184 | 10/1995 | Ingram et al. | 215/252 |
| 5,488,888 | 2/1996 | Kowal | 215/252 X |
| 5,660,289 | 8/1997 | Spatz et al. | 215/252 |

*Primary Examiner*—Allan N. Shoap
*Assistant Examiner*—Nathan Newhouse

[57] ABSTRACT

A tamper indicating package comprising a container having a neck with a threaded finish, an annular bead on the neck, a plastic closure which includes a base wall and a depending peripheral skirt having threads interengaging the threads of the container, and a tamper indicating band attached to the skirt by a plurality of weakened portions defining a line of severing. An annular flange extends axially upwardly and inwardly from the tamper indicating band toward the base wall of the closure and comprises a first continuous annular flange portion connected to the band by a hinge portion and a second portion which has free ends of the segment portions engaging beneath the bead on the container when the closure is threaded onto the container. The second portion comprises a plurality of segment portions extending upwardly and inwardly from the first continuous portion. The flange is bent intermediate its ends so that the second portion extends inwardly at a greater angle than the first continuous flange portion. The tamper indicating band has a plurality of circumferentially spaced recesses on an inner surface into which the segments extend when the closure is being applied to a container.

5 Claims, 9 Drawing Sheets

TAMPER INDICATING PACKAGE

This application is a continuation-in-part of application Ser. No. 08/535,803 filed Sep. 28, 1995, now U.S. Pat. No. 5,611,446, which continuation-in-part of application Ser. No. 08/239,141 filed May 6, 1994, now U.S. Pat. No. 5,462,184 which is a division of application Ser. No. 08/224,365 filed Apr. 7, 1994, now U.S. Pat. No. 5,370,520 which was a continuation of application Ser. No. 07/987,035 filed Dec. 7, 1992, now U.S. Pat. No. 5,310,069, which was a divisional of application Ser. No. 07/822,001 filed Jan. 16, 1992, now U.S. Pat. No. 5,219,507, which was a division of application Ser. No. 07/386,391 filed Jul. 27, 1989, now U.S. Pat. No. 5,090,788.

FIELD OF THE INVENTION

This invention relates to tamper indicating packages.

BACKGROUND AND SUMMARY OF THE INVENTION

In packaging of containers having closures thereon, it has been common to provide tamper indicating packages wherein the tamper indicating band is connected to the closure along the weakened line provided by a plurality of bridges or a scoreline and interengaging means between the band and the container are such that when the closure is unthreaded from the container, the band is severed along the bridge portions to indicate that the closure has been tampered with.

In U.S. Pat. No. 4,394,918 issued to Jean Grussen on Jul. 26, 1983, a threaded closure carries a hold ring that is joined to the bottom of the cap skirt by a series of breakable tabs and the hold ring has an inside diameter that is at least equal to the outside diameter of the cap skirt. A plurality of lock lugs supported on the ring are inclined upwardly and inwardly and are intended to hook behind a collar or mating ring on the container neck to prevent the hold ring from being lifted off the container neck when the cap is unscrewed.

In U.S. Pat. No. 4,550,844, having a common assignee with the present application, there is disclosed and claimed an arrangement wherein a continuous annular flange extends from the lower end of the tamper indicating band and is inclined upwardly and inwardly. Such an arrangement is effective but has the disadvantage in that the continuous flange requires excessive force to apply the closure to the container in certain extreme tolerance conditions.

In an effort to reduce the force required to apply the closure, it has heretofore been suggested in U.S. Pat. No. 4,653,657 that the free edge of the continuous annular flange be provided with a plurality of segments to facilitate application of the closure.

U.S. Pat. No. 4,807,771 proposes the use of a plurality of spaced-apart ring segments on the tamper indicating band to define independently foldable ring segments and a plurality of resilient tabs connected to each end of each ring segment so that the free ends of the tabs bear on the bead or ledge of the container.

In the aforementioned U.S. Pat. Nos. 5,090,788, 5,219,507, 5,310,069, 5,370,520 and 5,462,184 and application Ser. No. 08/535,803, there is disclosed a tamper indicating package and a method and apparatus for making the package. The tamper indicating package comprises a container having a neck with a threaded finish, an annular bead on the neck, a plastic closure which includes a base wall and a depending peripheral skirt having threads interengaging the threads of the container, and a tamper indicating band attached to the skirt by a plurality of weakened portions defining a line of severing. An annular flange extends axially upwardly and inwardly from the tamper indicating band toward the base wall of the closure and comprises a first continuous annular flange portion connected to the band by a hinge portion and a second portion which has free ends of the segment portions engaging beneath the bead on the container when the closure is threaded onto the container. In one form, the second portion comprises a plurality of segment portions extending upwardly and inwardly from the first continuous portion. In another form, the second portion comprises a second continuous flange portion. The flange is bent intermediate its ends so that the second portion extends inwardly at a greater angle than the first continuous flange portion.

Among the objectives of the present invention are to provide a tamper indicating package of the type shown in the aforementioned U.S. Pat. Nos. 5,090,788, 5,219,507, 5,310,069, 5,370,520 and 5,462,184 and application Ser. No. 08/535,803 filed Sep. 28, 1995 wherein the tamper indicating band is attached to the closure by bridges formed by a notched knife score line, that is, by use of an interrupted knife having an interrupted edge. The improvement relates to a notched knife scored closure of the type disclosed in the aforementioned patents and patent application which has and improved tamper evidency, ease of application, and minimizes band breakage on application by the closure applying machinery.

In accordance with the invention, the tamper indicating closure has a tamper indicating band which circumferentially spaced recesses for receiving portions of the segment portions during application of the closure to a container. The tamper indicating band has projections on its inner surface which extend into the seats between the segment portions when the closure is being applied. Each projection has a length in an axial direction and a width in a transverse direction. The upper portion of each projection blends with the inner surface of the tamper indicating band. The side surface of each projection converge toward the lower end. The sides of the slots are preferably V-shaped. Each segment portion is generally rectangular including a straight upper edge inclined sides to define the slots. Each recess is generally complementary in shape to each portion and includes an upper transverse surface and a base surface and side walls the lower ends of which merge with the inner surface of said tamper indicating band.

DESCRIPTION OF THE PREFERRED EMBODIMENT

Figures 1, 2, 3:
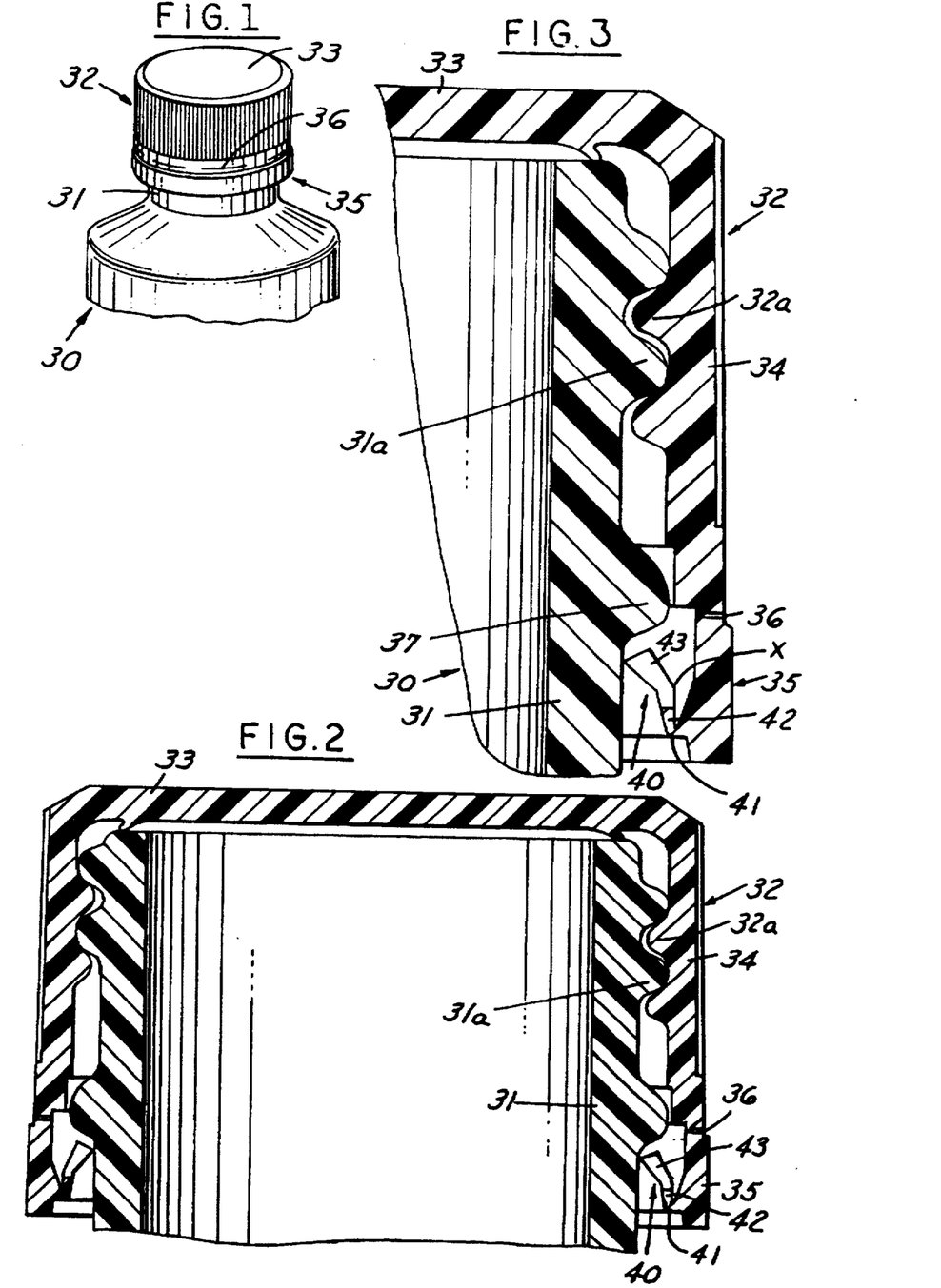
FIG. 1 is a fragmentary elevational view of a package embodying the invention.
FIG. 2 is a vertical sectional view of the package shown in FIG. 1.
FIG. 3 is a fragmentary sectional view of the package on an enlarged scale.

Referring to FIG. 1, the tamper indicating package embodying the invention comprises a container 30 having a finish or neck 31 and a closure 32. The closure 32 is formed of thermoplastic material such as polypropylene or polyethylene which is molded as a single unit and comprises a generally disc shaped top or base wall 33 with a cylindrical depending skirt portion 34 (FIG. 2). A tamper indicating band 35 which is generally cylindrical is connected to the peripheral skirt 34 by a weakened line defined by bridges or scored portions of the skirt 34, herein shown as an interrupted scoreline 36. Interengaging threads 32a, 31a are provided on the closure and neck and cooperate to apply and hold the closure in position on the container. The container 30 includes an annular bead 37.

Figures 8A, 8B, 9:
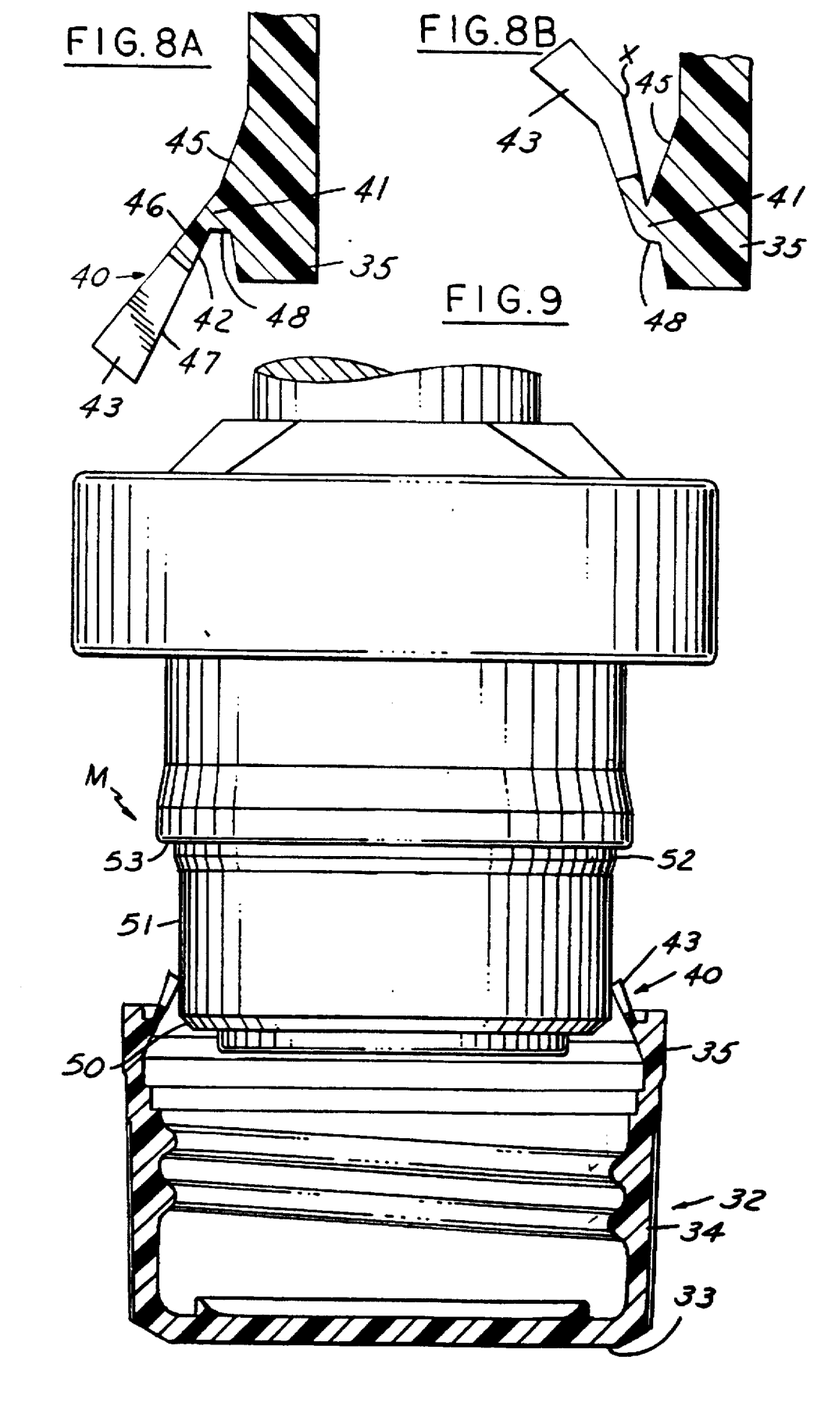
FIG. 8A is a fragmentary sectional view on an enlarged scale of a portion of the closure shown in FIG. 9.
FIG. 8B is a fragmentary sectional view on an enlarged scale of a portion of the closure shown in FIG. 8A, after it has been formed to its final configuration.
FIGS. 9–14 are partly diagrammatical sectional views showing the inversion of the flange from the as-molded position to the final position in closure.

Referring to FIGS. 2, 3, and 8B, an annular flange 40 is connected to the inner surface of the tamper indicating band by an integral hinge portion 41 that is spaced so that it extends radially inwardly of the inner surface of the tamper indicating band 35 and the flange 40 extends upwardly and inwardly toward the base wall of the closure. The flange 40 includes a first continuous annular flange portion 42 that extends from hinge portion 41 at a slight angle radially inwardly before the closure is applied to the container. The flange 40 further includes a second portion in the form of a plurality of integral circumferentially spaced segment portions 43 extending from the free edge of the first continuous flange portion 42. The flange 40 is bent at X intermediate its ends so that the free ends of the segment portions 43 extend at a different and greater angle with the axis of the closure than the first continuous flange portion 42 of the annular flange 41. The annular flange portion 42 thus has a first pivot or hinge relative to the band 35 through hinge portion 41 and the segment portions 43 have a second hinge with respect to the remainder of flange 40 at X. The first continuous flange portion 42 extends axially at a very small acute angle with respect to the band 35 so that it is substantially vertical before the closure is applied to the container.

The width of each segment portion 43 is at least several times greater than the thickness at its smaller cross section. The segment portions are generally rectangular and closely spaced apart by narrow slots S such that the segment portions comprise the major portion of the second portion. The number of segment portions 43 is preferably twelve but may be as few as two. The slots S preferably extend from the free edge of the segments beyond the bend line X so that the length of the segment portions 43 is greater than the corresponding length of flange portion 42. Satisfactory results have been achieved where segment portions 43 of the flange 40 comprise about 60% of the flange 40 while the flange portion 42 comprises about 40%. However, the length of the slots may vary. It is essential that the continuous flange portion 42 have a sufficient dimension or length so that the flange 40 will remain inverted, without heat forming and curing, as hereinafter described.

Figure 5:
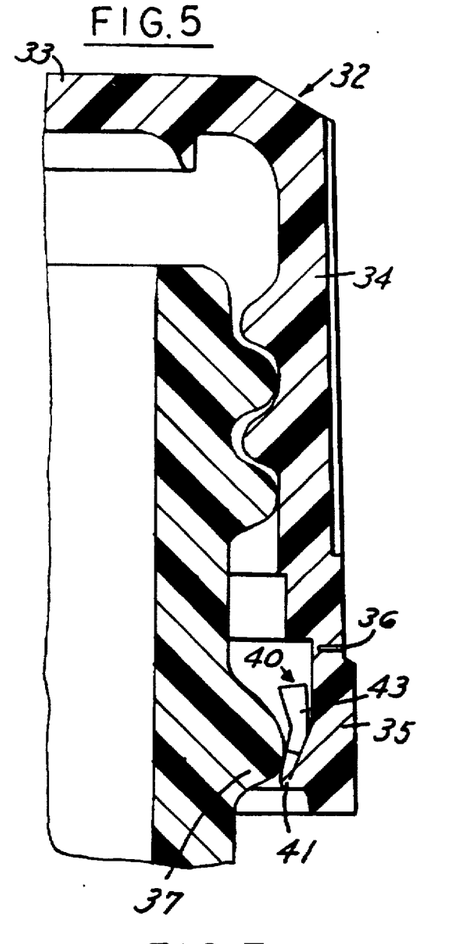
FIG. 5 is a fragmentary sectional view showing the application of the closure to the container.

As shown in FIG. 5, when the closure 32 is applied to the container 30, the continuous flange portion 42 first engages the annular bead 37 on the container 30 and flexes the flange 40 outwardly. During application, the first continuous portion flexes radially outwardly and the free ends of segment portions 43 may contact the inner surface of band 35. Further threading of the closure on the container causes segment portions 43 to flex radially inwardly beneath the bead 37 of the container 30 (FIG. 3). When the closure is applied, the first continuous flange portion 42 is substantially vertical and the free edges of segment portions 43 engage the neck of the container below bead 37.

It has been found that the closure which forms part of the tamper indicating package requires a substantially lower application force in applying the closure and yet effectively provides the desired tamper indicating protection. It is believed that the considerable reduction in application force to pass over the bead on the container is achieved by reducing the hoop strength of the flange 40 toward its extremity. It is preferred that the bend in the flange 40 be at or near the juncture of the segment portions 43 with the flange portion 42. In such an arrangement, the segment portions 43 are at a thickness at the bend line X such that they are able to bend approximately along hinge line X. A radially outward force on the tips of the segment portions 43 will first cause bending at the second hinge line X and thus allow easier deflection of the segment portions 43 of the flange 40, thereby reducing application force. Where the length of the slots S is such that the base of the slots is intermediate the bend line X and the free ends of the segment portions 43, the segment portions 43 may flex adjacent the base of the slots that define the segment portions.

Figure 22:
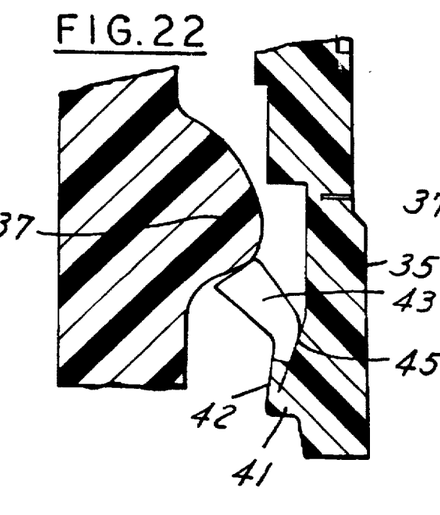
FIG. 22 is a sectional view similar to FIG. 3 showing the relative position of the container and closure during removal of the closure.
Figure 23:
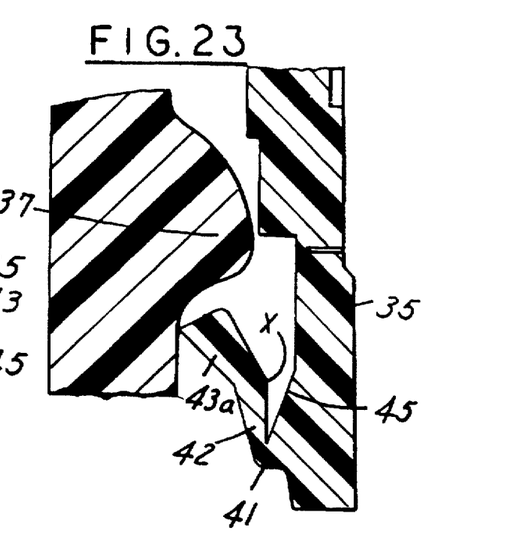
FIG. 23 is a fragmentary sectional view of a modified form of closure in position on a container.
Figure 24:
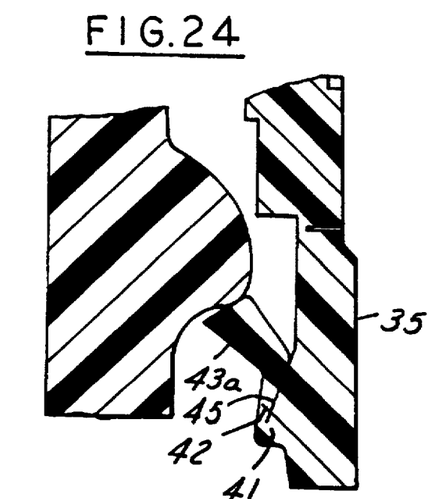
FIG. 24 is a sectional view of the container and closure shown in FIG. 23 during removal of the closure.
Figure 25A:
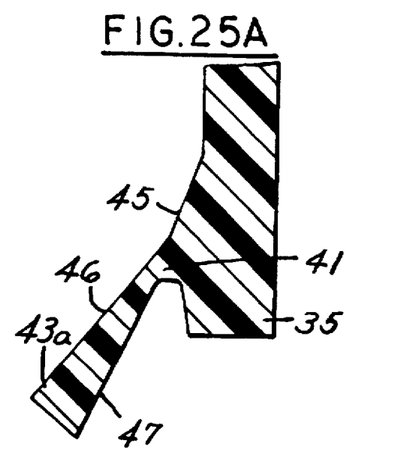
FIG. 25A is a fragmentary sectional view of the closure shown in FIGS. 23 and 24 as it is molded.
Figure 25B:
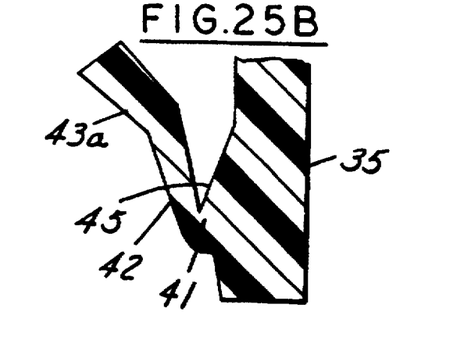
FIG. 25B is a fragmentary sectional view of the closure shown in FIG. 25A after it is has been formed to its final configuration.

As shown in FIG. 22, when the closure is rotated to remove the closure from the container, the free edges of segment portions 43 engage the bead 37. Continued rotation of the closure 32 causes the flange 40 to bend along the line X and bring the segment portions 43 into engagement with the inner inclined surface of band 35. Further rotation causes the band to be severed along the scoreline.

Figure 4:
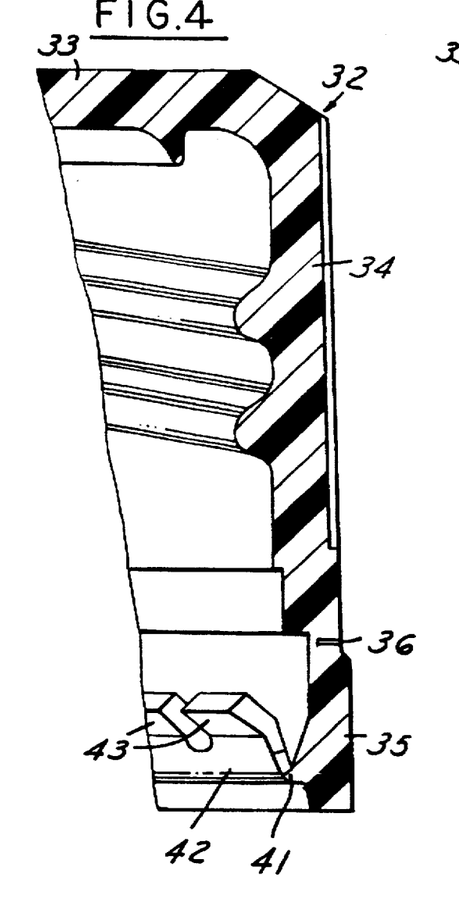
FIG. 4 is a fragmentary sectional view on an enlarged scale of a portion of the closure.
Figure 6:
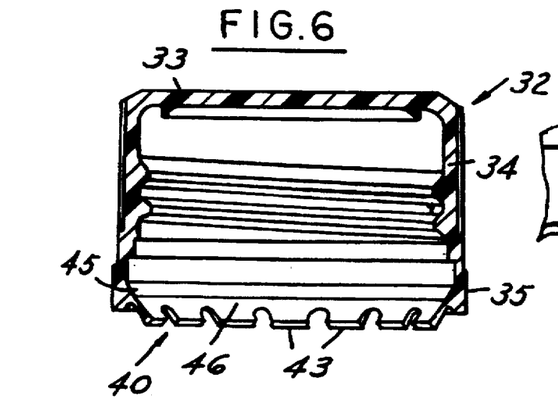
FIG. 6 is a sectional view of the closure as it is molded.
Figure 7:
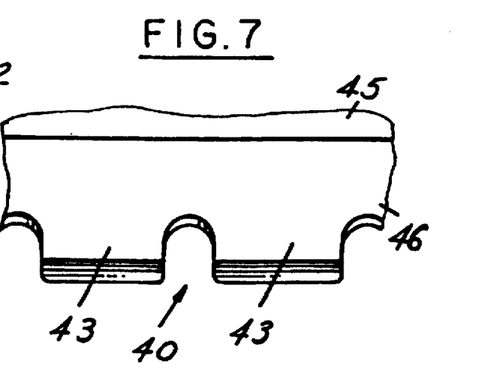
FIG. 7 is a fragmentary elevational view of a portion of the closure shown in FIG. 6.

Although the closure could, by complex molding apparatus, be made to the final configuration as shown in FIG. 4, it is preferred that the closure be made with the flange 40 extending radially and inwardly and axially outwardly away from the base wall of the closure. Accordingly, as shown in FIGS. 6 and 7, the closure 32 is preferably molded by injection molding or compression molding with the annular flange portion 42 and segments extending radially downwardly and inwardly relative to the base wall 33 of the closure 32 with the annular flange and segments being preferably aligned with one another. More specifically, as shown in FIG. 7, the first hinge portion 41 connecting the annular flange portion 42 to the band 35 includes an upper inclined surface 45 that extends downwardly and inwardly from the inner surface of band 35 and that merges through an arc to a straight upper surface on the annular flange portion 42 and segment portions. The lower surface 47 of the annular flange 40 is at an angle to the upper surface so that the flange 40 becomes increasingly thicker toward the free end. The lower surface 48 of the hinge 41 is generally horizontal connected by small arc to the interior surface of the peripheral skirt.

After forming to the configuration shown in FIG. 8A, the flange 40 can be deformed to provide the flange portion 42 at a substantially vertical angle and deform to form the bend X and then the flange 40 may be inverted in accordance with well-known techniques. However, it has been found by proper control of the inversion process, the continuous flange portion 42 can be deformed so that it is substantially vertical and the bend X can be simultaneously formed during the inversion. More specifically, by proper control of the inversion, the elastic limit of the flange portion 42 can be exceeded to decrease the angle which the flange portion 42 forms with the axis of the closure and the elastic limit of the flange at the line X can be exceeded to form the bend desired.

It has been found that the inversion of the annular flange portion 42 and segment portions 43 to form the separate angular relationship between the annular flange portion and the segment portion 43 is preferably achieved by a plunger or mandrel M such as shown in FIGS. 9–14 and comprises a free end having a cap centering cone 50, a thread location diameter for engaging the diameter of the threads of the closure, a first inclined portion, a pilot diameter 52 and a laterally inclined inverting shoulder 53 that engages the segment portions to invert the segment portions and the annular flange portion, as presently described.

Figure 10:
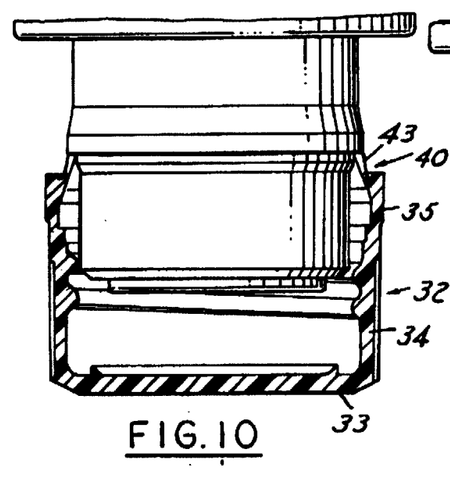
Figure 11:
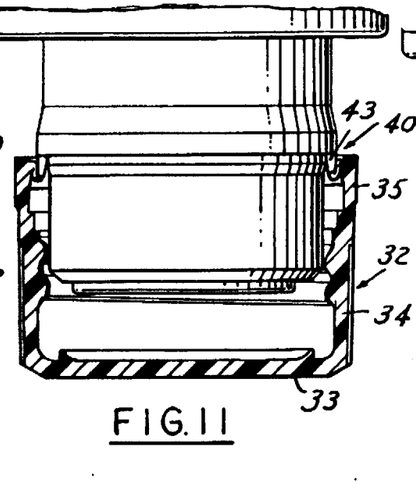

The successive steps during the inversion are shown in FIGS. 9–14 and include the following:

a) The closure is advanced into the tooling nest radially with respect to a machine, and is approximately located on center by an inverting mandrel M. The mandrel M may at this time be rotating in order to effect a subsequent scoring operation.

b) Relative axial movement takes place between the closure 32 and the mandrel M by cam actuation of the respective tooling (top and bottom).

c) The relative advance of the mandrel M to the closure 32 initially engages the segment portions 43 of the closure against the cap centering cone 50 (FIG. 9). This action centers the closure 32 under the mandrel M by displacing the closure sideways as necessary to correct misalignment.

d) As the above relative movement continues, the segment portions 43 engage the thread location diameter 51, and the friction therebetween may impart a rotational motion to the closure, if desired, such that when the segment portions 43 reach the pilot diameter 52, the closure is either at or close to the rotational speed of the mandrel (FIG. 10).

e) As the segment portions 43 engage the pilot diameter 52, they engage with more interference, and this is critical for this inversion method. The hoop strengths of the flange portion 42 and segment portions 43 direct the free ends of the segment portions 43 toward the mandrel M, and thus ensure that they do not slip over the inverting shoulder 53 (FIG. 11). Further, this interference provides further rotational drive to the cap, if desired, and for this reason it is preferred that the relative axial movement is in dwell at this time to ensure that there is little or no relative rotational movement between the closure and the inversion shoulder at the time of inversion. This reduces the possibility of scuffing of the tips of the segment portions.

It is desirable at this time that the thread location diameter 51 of the mandrel engage the closure threads to hold the closure 32 in firm concentric relationship to the mandrel M.

Figure 12:
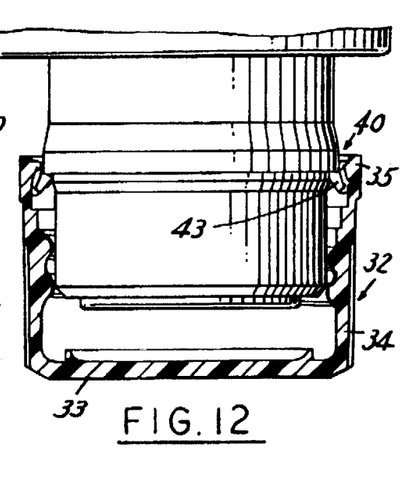

Further, relative axial movement of the mandrel M with respect to the lower tooling (and closure) causes the flange 40 to be folded downwardly, and initially to be contained within the annular space between the pilot diameter of the mandrel and the band 35 (FIG. 11). This causes a bending within the section of the flange 40, the center of this bending moving in the direction downward toward the top 33 of the (upside down) closure (FIG. 12).

Figure 13:
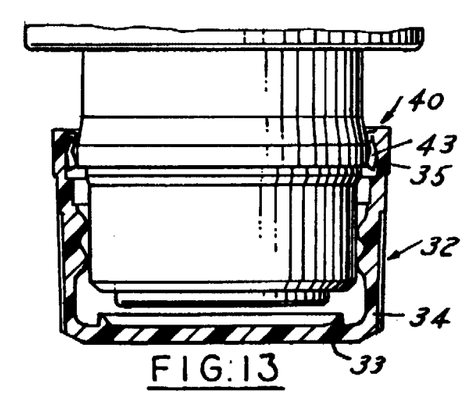

This action continues, whereby the bending action passes along the flange toward its tip, and toward successively increasing thickness of segment portions 43 (FIG. 13). At some point in this process, the band is expanded such that the segment portions 43 are inverted by the axial movement of the mandrel (FIG. 13).

This action initially induces a stress in the segment at the bend line X, which causes a permanent bend in the flange 40 toward the inside of the closure.

Figure 14:
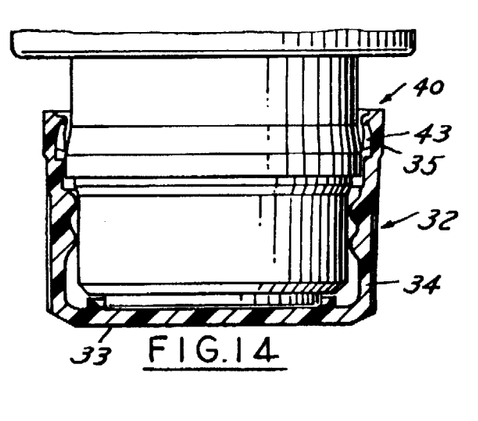

As the mandrel M advances further, the shoulder 52 passes through the diameter of the first hinge 41 (FIG. 14).

This action causes the continuous annular flange 42 to be moved such that the flange portion 42 exceeds the elastic limit at the hinge 41 so that it remains in a substantially vertical position in the final closure after the closure is removed from the mandrel. This further reduces the interference of the hinge over the tamper bead of the container to which it is applied.

During withdrawal of the mandrel, the closure 32 is removed by a fixed stripper (not shown) which engages the rim of the closure 32, and extends at least 180° around the circumference of the closure (not illustrated).

The plunge invert tooling described thus has two major effects:

(a) Deforming the flange portion 42 back toward the closure wall 35.

(b) Forming the bend X to create a permanent bend, to allow the segment portions 43 to project radially inwardly to a greater angle than the first continuous flange portion 42.

It has been found that after inversion in the manner described above, the flange 40 is in stable condition and this has been achieved without the necessity of heating.

Figures 15, 16:
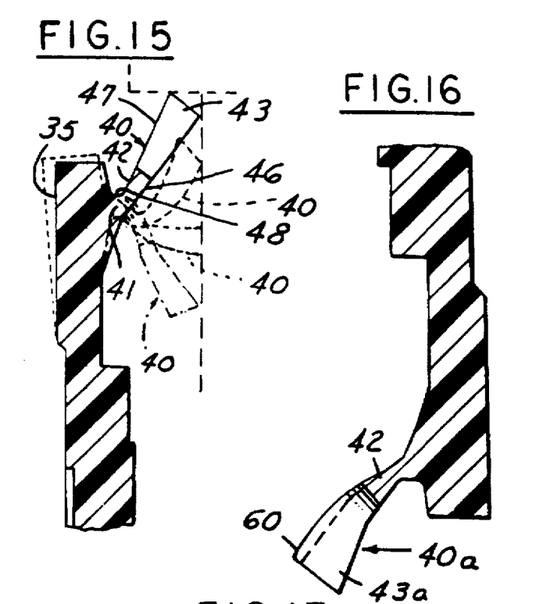
FIG. 15 is a schematic diagram of the inversion of the flange on the tamper indicating band of the closure.
FIGS. 16–18 are sectional views of portions of a modified closure.
Figure 17:
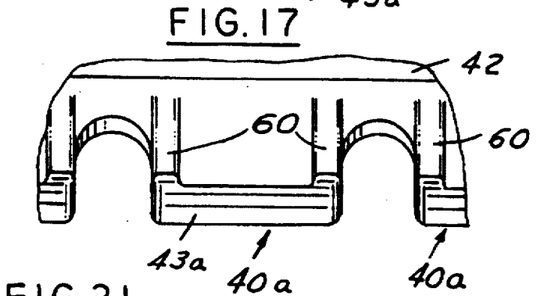
Figure 18:
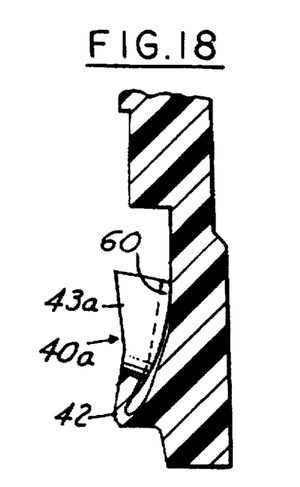

In the form of closure shown in FIGS. 16–18, the flange 40a has segment portions 43 with raised portions 60 along each axial edge thereof positioned adjacent the inner surface of the flange 40a when the flange 40a is inverted. Such a thickening of the side edges provides rigidity to each segment portion 43a in an axial direction while permitting circumferential flexing of each segment portion 43a so that it may tend to conform with the finish.

Figure 19:
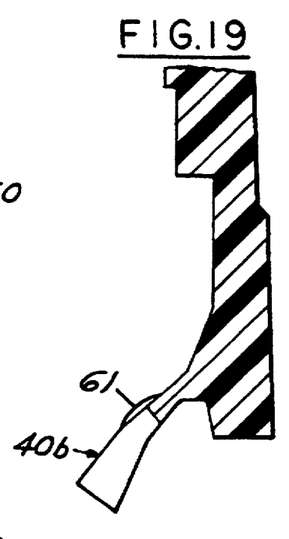
FIGS. 19–21 are sectional views of portions of another modified closure.
Figure 20:
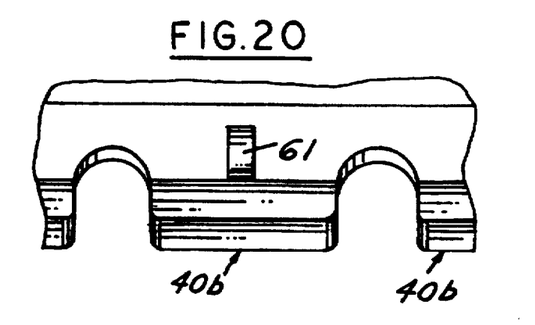
Figure 21:
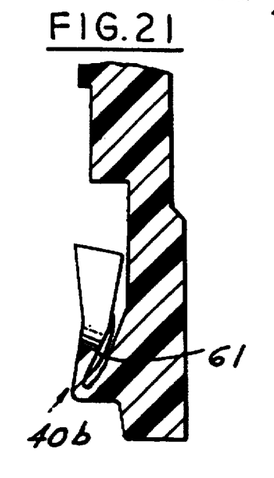

In the form shown in FIGS. 19–21, a raised rib 61 on the flange 40b performs a similar function.

In the form of closure shown in FIGS. 23, 24, 25A and 25B, the second portion 43a comprises a second continuous flange portion which is connected to continuous flange portion 42 and extends at a greater angle therefrom. In all other respects, the closure is similar, is made in the same manner, and functions in the same manner.

Figure 26:
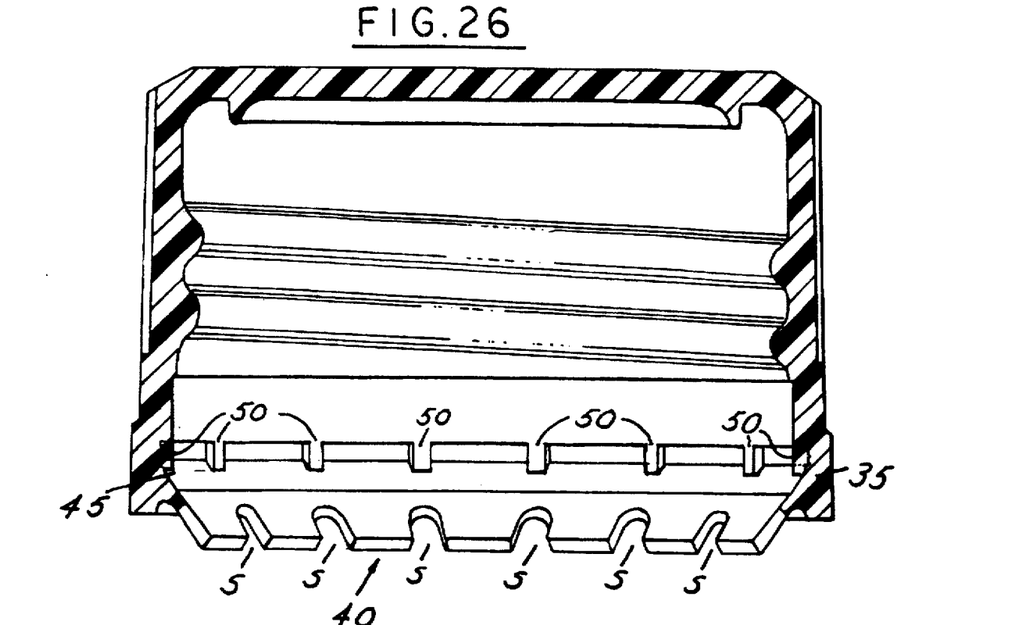
FIG. 26 is a sectional view of another modified form of closure as it is molded.
Figure 27:
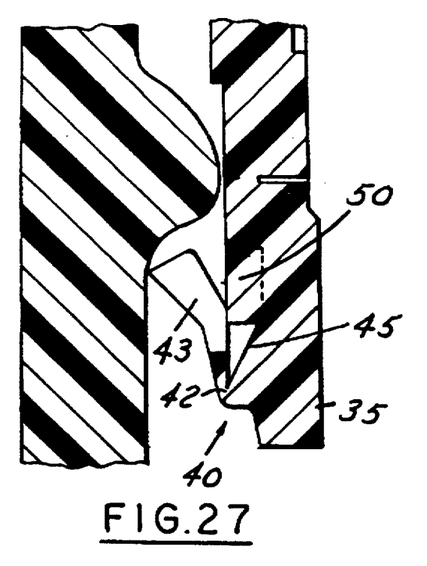
FIG. 27 is a fragmentary sectional view showing the closure shown in FIG. 26 after it is formed and applied to a container.
Figure 28:
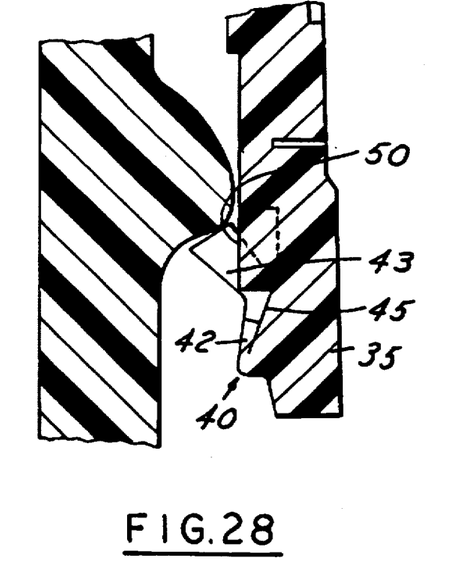
FIG. 28 is a fragmentary sectional view showing the closure of FIG. 26 as it is being removed.
Figure 29:
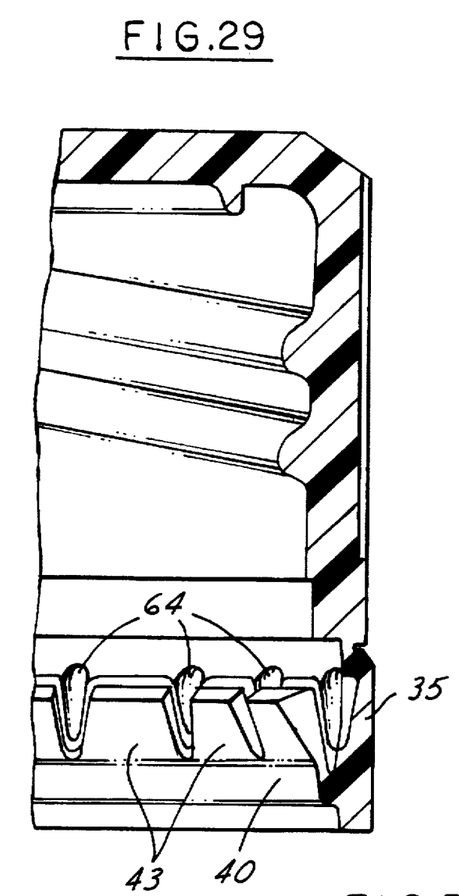
FIG. 29 is a fragmentary sectional view similar to FIG. 8B of a modified form of closure in accordance with the invention.
Figure 30:
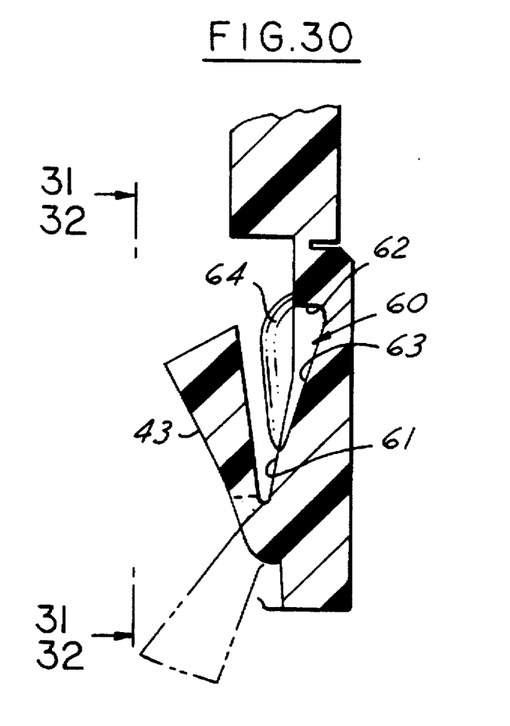
FIG. 30 is an enlarged fragmentary sectional view of a portion of the closure shown in FIG. 29.
Figure 31:
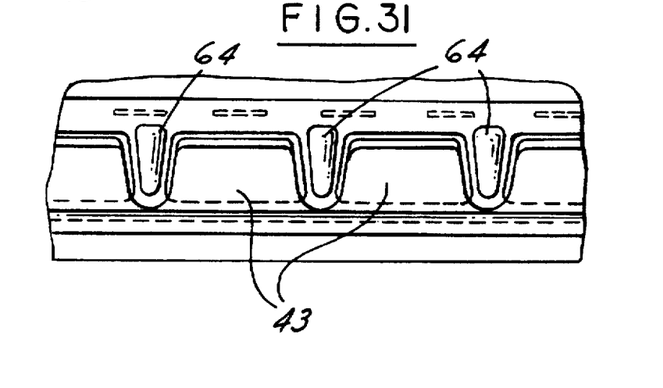
FIG. 31 is a fragmentary view taken along the line 31—31 in FIG. 30.
Figure 32:
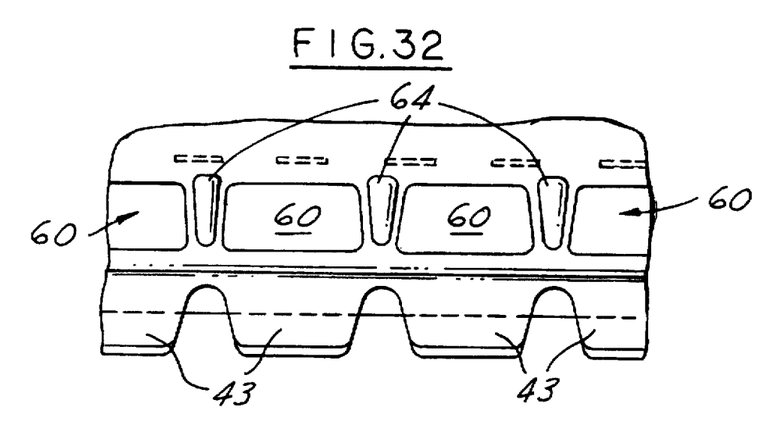
FIG. 32 is a view similar to FIG. 31 taken along the line 32—32 in FIG. 31, showing the closure after being molded.

In the modified form of closure shown in FIGS. 26–28, the closure is identical to that shown in FIGS. 2–8A and 8B except for the provision of circumferentially spaced axially extending projections 50 on the inner surface of the band 35 above the inclined surface 45. The projections are aligned with the slots S and have a width slightly less than the width of the slots. The length of the projections as shown in FIGS. 27 and 28 is such that lower edges of the projections are not engaged by the second portion of the flange 40, namely, the segment portions 43.

When the closure is applied to the container, the projections function to deter any attempts to tamper with the tamper indicating band by hooking a tool on the segment portions 43.

The aforementioned construction is substantially disclosed in the aforementioned U.S. Pat. Nos. 5,090,788, 5,219,507, 5,310,069, 5,370,520, 5,462,184 and continuing application Ser. No. 08/535,803.

Figure 33:
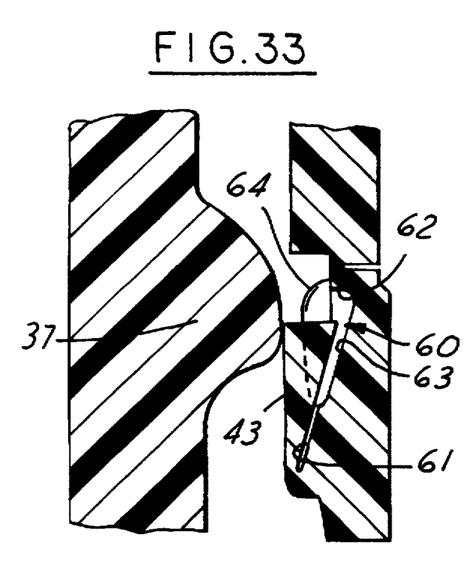
FIG. 33 is a fragmentary sectional view similar to FIG. 30 showing the closure being applied to a container.

A modified form of plastic closure is shown in FIGS. 29–34. This form is substantially the same as that shown in FIGS. 1–8B. The tamper indicating band 35 is provided with circumferentially spaced axially extending recesses 60 which face radially inwardly on the inside surface 61. Each recess 60 on the tamper indicating band 35 has a generally rectangular cross section including an upwardly and outwardly inclined surface 63 and a radial surface 62. The axial height of each recess 60 is less than the axial length of each segment 43 on flange 40 of band 35. The axial height width of each recess 60 is greater than the axial height of the segment 43 and the circumferential width of each is greater than the circumferential width of each segment 43 such that the recesses 60 and segments 43 are generally complementary. As a result, when the closure is applied to a container, a part of each segment 43 extends into the adjacent recess 60 during application of the closure to a container as shown in FIG. 33.

Figure 34:
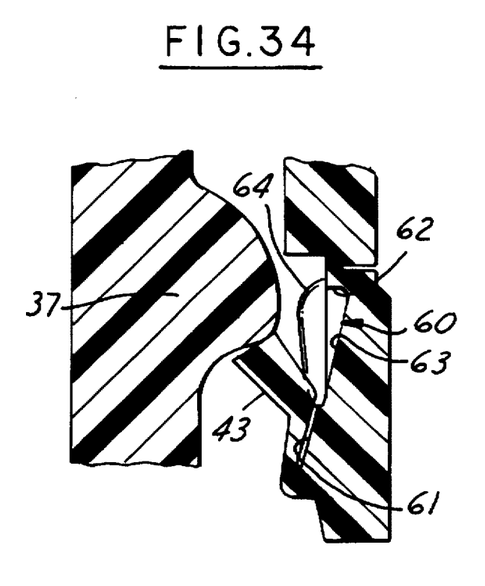
FIG. 34 is a fragmentary sectional view showing the closure during removal from a container.

In accordance with another aspect of the invention, circumferentially spaced raised axial ribs or projections 64 are provided on the inside surface 62 of the band 35 between recesses 60. The upper end of each projection 64 is rounded. Each projection 64 extends axially and is generally triangular conforming to the configuration of the slots between segments 43. Referring to FIG. 34, when the closure is being removed, the projections 64 project through the slots between segments 43 and engage the annular bead 37 on the container during removal. The projections assist in centering the closure and maintaining the band 35 more concentric to the finish to avoid tiring or inverting action of the band 35 which can result if the band 35 is allowed to move laterally of the finish. The projections 64 also provide additional strength to the band 35 having recesses therein. The overall weight of a closure with recesses 60 and projections 64 remains, however, substantially the same as closure without recesses and projections.

It can thus be seen that there has been provided a tamper indicating package with an improved arrangement for interengaging the closure with the container so that when the closure is removed the tamper indicating band remains on the container; wherein the closure can be readily applied to the container; and wherein the tamper indicating package effectively minimized tampering.

What is claimed is:

1. A tamper indicating closure comprising a plastic closure which includes a base wall and a depending peripheral skirt having threads adapted to interengage threads of a container, and a tamper indicating band attached to said skirt by one or more weakened portions defining a line of severing.

an annular flange extending axially upwardly and inwardly from said tamper indicating band toward said base wall of the closure, and said flange comprising a first continuous annular flange portion connected to the inner surface of said tamper indicating band by a hinge spaced radially inwardly from said inner surface of said band, said flange being bent intermediate its ends such that a second portion extends inwardly at a greater angle to the axis of said closure than said first portion being adapted to engage beneath a bead on a container, said second portion comprising a plurality of circumferentially spaced segments separated by narrow slots extending upwardly and inwardly from the continuous flange.

said band having a plurality of circumferentially spaced recesses constructed and arranged such that when the closure is being applied to a container, a part of each segment extends into the adjacent recess.

2. The tamper indicating closure set forth in claim 1 wherein said recesses and segments are complementary in shape.

3. The tamper indicating closure set forth in claim 2 wherein the recesses have a circumferential width substantially equal to the circumferential width of said segments.

4. The tamper indicating closure set forth in claim 3 wherein the axial height of each said recess is greater than the axial height of each said segment.

5. The tamper indicating closure set forth in any one of claims 1–4 including a plurality of circumferentially spaced projections on the inner surface of said band between said segments such that when the segments engage an annular bead on a container when the closure is being removed from a container, the projections extend into the slots between said segments to assist in maintaining concentricity of the tamper indication closure on the container.

* * * * *